April 3, 1934.　　　J. A. SEEDE　　　1,953,780

ARC WELDING

Filed Jan. 16, 1931

Inventor:
John A. Seede,
by Chas. E. Mullen
His Attorney.

Patented Apr. 3, 1934

1,953,780

UNITED STATES PATENT OFFICE 1,953,780

ARC WELDING

John A. Seede, Schenectady, N. Y., assignor to General Electric Company, a corporation of New York Application January 16, 1931, Serial No. 509,214

2 Claims. (Cl. 219—8)

My invention relates to arc welding.

The voltage of a welding arc varies with its length, and it has been found that the best welds are produced when the arc length and voltage are confined within certain limits.

In the practice of arc welding using a metallic electrode it is generally agreed that a voltage across the arc in excess of 25 volts produces defective or unreliable welds. Too short an arc, on the other hand, also results in defective welds. Too long an arc will burn or oxidize the weld metal and, due to the unstable nature of a long arc, it is difficult to obtain the desired penetration of the weld or fusion of the parent metal. Too short an arc is undesirable because of its lack of sufficient heat to secure adequate penetration of the weld into the parent metal. Generally the operating range for a metallic arc is from 15 to 25 volts. If the voltage exceeds the upper limit or falls below the lower limit, the resultant weld is almost certain to be defective.

The voltages given above are for arcs in air operating with the usual current values employed in welding. In atmospheres other than air, such as produced by fluxes or shielding atmospheres, and with extreme current values the voltages may vary from the values given above. However, for every condition of welding there will be a voltage range within which it is desirable to conduct the welding operation.

In the teaching of arc welding and in the practice of commercial arc welding, it is desirable to check in some way those operators who through lack of skill or care operate with too long or too short an arc and thereby produce defective welds.

It is an object of my invention to provide means for warning the operator and/or his supervisor when he is welding with an abnormal arc that is, an arc which is not suitable for producing satisfactory welds.

More particularly an object of my invention is to provide means for giving a warning when the arc voltage exceeds or falls below a predetermined value or range which has been found by experience to give the best welding results.

My invention will be better understood from the following description taken in connection with the accompanying drawing, and its scope will be pointed out in the appended claims.

Figure 1:
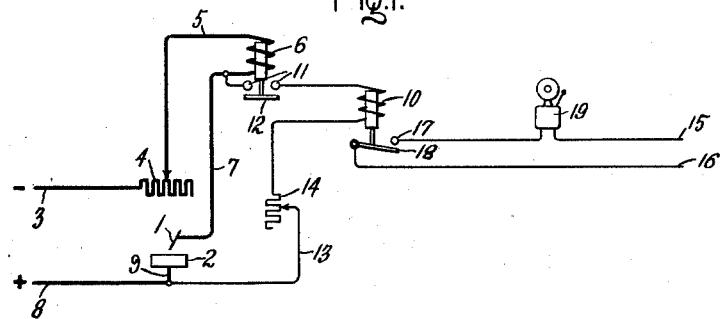
Figure 2:
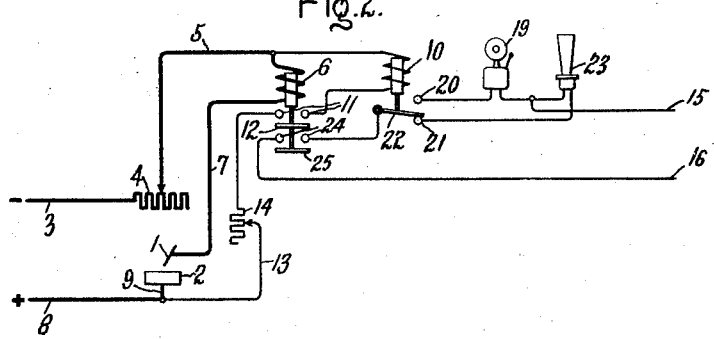

In the drawing Fig. 1 diagrammatically represents welding apparatus in which means are provided for warning the operator and/or his supervisor when the voltage of the arc exceeds a predetermined desired value, and Fig. 2 diagrammatically represents a system in which means are provided for warning the operator and/or his supervisor not only when the arc voltage exceeds a predetermined limit, but also when it falls below a predetermined limit.

Referring to the diagrammatic representation of Fig. 1 of the drawing means are there shown for maintaining an arc between the welding electrode 1 and the work 2. This means may be a constant current welding generator, or a constant potential source with a balancing resistance as shown in the drawing. The electrode 1 is connected to the constant potential main 3 through a resistor 4, conductor 5, current responsive relay 6 and a conductor 7, and the work 2 is connected to the constant potential main 8 through the conductor 9. A voltage responsive relay 10 is connected through contacts 11 and 12 of the relay 6 and conductors 7, 13 and 9 across the welding arc maintained between the electrode 1 and the work 2. An adjustable resistance 14 is also provided in the circuit of the relay 10 for setting the relay for the desired operating voltage. The relay 10 when sufficiently energized closes a circuit 15, 16 through contacts 17 and 18 to operate an alarm signal shown in Fig. 1 as a bell 19. In Fig. 1 the contacts of relays 6 and 10 have been shown in the positions they assume before the welding arc has been struck.

The operation of the system just described is as follows:—When the operator touches the electrode 1 to the work 2 in order to strike an arc, welding current flowing from the mains 3, 8 through resistor 4, conductor 5, coil of relay 6, conductor 7, electrode 1, work 2, and conductor 9 energizes the relay 6 and closes the contacts 11 and 12. The relay 10 is thereby connected through conductor 7, contacts 11 and 12, resistor 14 and conductors 13 and 9 across the electrode 1 and work 2. When the operator withdraws electrode 1 from the work 2 to strike the arc the voltage of the arc is thus applied to the voltage responsive relay 10 and as soon as the voltage of the arc exceeds the operating value for which the relay 10 has been set the relay is operated thereby closing contacts 17 and 18 and completing the ringing circuit of the bell 19, which gives an alarm warning the operator and/or his supervisor that he has exceeded the desired welding voltage. The operator will thereupon advance the electrode 1 toward the work 2 to decrease the arc length and voltage, and the relay 10 will then return to its illustrated position and the bell will cease to ring. As soon as the operator again exceeds the desired arc welding voltage the relay 10 will complete the ringing circuit of bell 19 and give him and his supervisor a warning of this transgression on his part.

In Fig. 2 the arrangement of Fig. 1 has been modified so as to adapt the system for giving a warning when the operator is employing too high an arc voltage, and also when he is employing too low an arc voltage. To accomplish this result the voltage responsive relay 10 is provided with a fixed upper contact 20 and a fixed lower contact 21, both of which may be engaged by a movable contact 22 under the control of the relay 10. When the arc voltage is too high, contacts 20 and 22 are closed to complete the ringing circuit of bell 19 and when the arc voltage is too low, contacts 21 and 22 are closed thereby completing the operating circuit of the horn 23. The operating circuit 15, 16 for the bell 19 and horn 23, is completed through additional contacts 24 and 25 associated with relay 6 so as to deenergize the horn circuit when the welding operation is interrupted and the contact 22 falls to its lower position against contact 21. In view of what has been set forth in connection with the operation of the system of Fig. 1, the operation of the system of Fig. 2 is believed to be perfectly obvious and will be not be described.

My invention is applicable to alternating current arc welding as well as direct current arc welding and to carbon arc welding as well as metallic arc welding. When alternating current is employed a stabilizing reactance may be employed instead of the stabilizing resistance shown in Figs. 1 and 2 of the drawing. Signals other than the audible signals above referred to may be used. For example, visual signals may be used. Furthermore, a plurality of simultaneously operated signals may be employed. When a plurality of signals are employed, it will be desirable to locate one of the signals so as to warn the operator and to locate another signal where the overseer may readily check the performance of this operator. In such installations visual and audible signals may be used together. Other means responsive to abnormal operating conditions of the arc may be used in place of the voltage means illustrated in the drawing. For example, current responsive means or current and voltage responsive means may be employed. I therefore aim in the appended claims to cover such changes and modifications as fall within the true spirit and scope of my invention.

What I claim as new and desire to secure by Letters Patent of the United States is:

1. Welding apparatus comprising means for maintaining a welding arc, a plurality of signals, means responsive to arc voltage for operating one of said signals when the voltage of the arc is greater than the upper limit of predetermined operating range of arc voltage and the other of said signals when the voltage of the arc is less than the lower limit of said operating range, and means for deenergizing said last mentioned means upon interruption of the flow of current to the welding arc.

2. Welding apparatus comprising means for maintaining a welding arc, a signal, voltage responsive means for operating said signal, and means including a welding current responsive means for connecting said voltage responsive means across the terminals of said welding arc.

JOHN A. SEEDE.